UNITED STATES PATENT OFFICE.

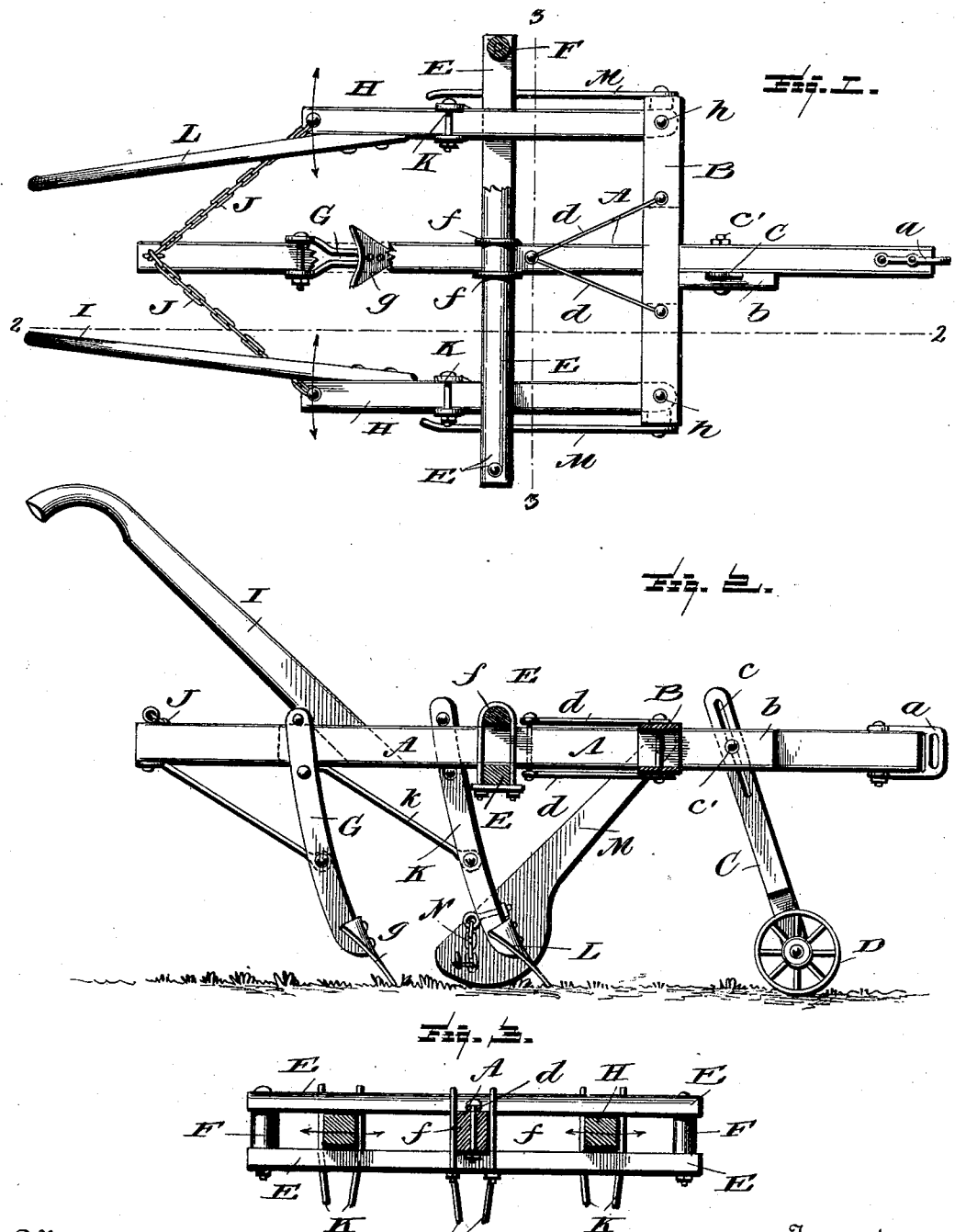

JAMES A. MARTIN, OF FAUNSDALE, ALABAMA.

CULTIVATOR.

SPECIFICATION forming part of Letters Patent No. 483,075, dated September 20, 1892.

Application filed June 4, 1892. Serial No. 435,480. (No model.)

*To all whom it may concern:*

Be it known that I, JAMES A. MARTIN, a citizen of the United States, residing at Faunsdale, in the county of Marengo and State of Alabama, have invented certain new and useful Improvements in Cultivators; and I do hereby declare that the following is a full, clear, and exact description of the same, reference being had to the annexed drawings, making a part of this specification, and to the letters of reference marked thereon.

This invention relates to certain new and useful improvements in cultivators; and it has for its objects, among others, to provide an improved cultivator with adjustable sweeps and with an adjustable front wheel and to provide the side sweeps with flexibly-held fenders which will prevent small plants from being covered with the dirt. The central sweep is designed to work in the water-furrow and break the middle of furrow right and left. The device as a whole is simple in its construction, cheap of manufacture, all the parts are readily adjustable, and in practice it has proved most efficient for the purposes for which it is intended.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a top plan of my improved cultivator. Fig. 2 is a vertical longitudinal section on the line 2 2 of Fig. 1. Fig. 3 is a cross-section on the line 3 3 of Fig. 1.

Like letters of reference indicate like parts throughout the several views in which they appear.

Referring now to the details of the drawings by letter, A designates the main central beam, to the forward end of which a clevis or any other suitable device $a$ may be attached. B is a cross-bar secured to this beam near its forward end, and to the beam just in front of this cross-bar is secured a guide $b$, in which is held the arm C, which is provided with a longitudinal slot, in which works a bolt $c'$, which passes through the slot $c$ and is held in its adjusted position by a nut on one end thereof. This arm carries at its lower end the wheel D, which serves to take the weight of the cultivator off the points of the sweeps.

The cross-bar B consists of two bars, one above and the other below the beam, as seen best in Fig. 2, and suitably braced, as by the braces $d$.

To the rear of the cross-bar B are secured the plates or bars E, one above and the other beneath the beam A, and their ends connected by vertical pintles, on which are journaled the vertically-disposed rollers F, as seen best in Fig. 3. These plates or bars are held in place at the center by the stirrups and nuts $f$, as seen in Figs. 2 and 3. To the rear end of the central beam is secured the sweep-standard G, suitably braced and carrying the sweep $g$.

H are longitudinal bars pivoted at their forward ends upon vertical pivots $h$, held in the forward cross-bar and extended to the rear and loosely guided between the plates E, as seen best in Fig. 3. To the rear ends of these bars are attached the handles I, which may be of any form, and the rear ends of the said side bars are connected to the central beam by the chains J, which serve to limit the outward movement of the side bars upon their pivots. To the bars H, near their rear ends, are secured the side sweep-standards K, which are suitably braced, as by the braces $k$, and which carry at their lower ends the sweeps L, as shown. It will be readily seen that by this construction the side sweeps may be readily adjusted by the handles to bring the sweeps closer together or farther apart.

M are fenders pivoted at their upper ends to the ends of the forward cross-bar and extended rearward in an inclined direction, as seen in Figs. 1 and 2, their rear ends being considerably broadened, as seen in Fig. 2, and said rear ends are flexibly and movably connected with the side sweeps, as by the short chains N, as seen best in Fig. 2. These fenders will serve to prevent small plants from being covered with the dirt.

What I claim as new is—

1. The combination, with the central beam and its front cross-bar, of the adjustable side bars with their sweeps, and the fenders pivoted at their forward ends on the ends of the front cross-bar and extended rearward in an inclined direction, with their rear ends broadened and terminating opposite to and flexibly and movably connected with the said sweeps, as set forth.

2. The combination, with the central beam and its front cross-bar, of the side bars pivoted at their forward ends to the front cross-bar, the handles attached to the side bars, the guide-plates on the beam and between which the side bars are guided, the sweeps, the rollers journaled between the ends of the guide-plates, the inclined pivoted fenders connected by chain to the forward sweeps, and the chains connecting the rear ends of the side bars with the beam, as and for the purpose specified.

In testimony that I claim the above I have hereunto subscribed my name in the presence of two witnesses.

JAMES A. MARTIN.

Witnesses:
B. C. MINGLE,
C. E. MOSK.